(12) United States Patent
Chung et al.

(10) Patent No.: US 9,048,924 B2
(45) Date of Patent: Jun. 2, 2015

(54) RELAY STATION IN RADIO COMMUNICATION SYSTEM AND OPERATING METHOD FOR THE RELAY STATION

(75) Inventors: Jae Hoon Chung, Anyang-si (KR); Kyu Jin Park, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 25 days.

(21) Appl. No.: 13/056,129

(22) PCT Filed: Jul. 30, 2009

(86) PCT No.: PCT/KR2009/004265
§ 371 (c)(1),
(2), (4) Date: Jan. 27, 2011

(87) PCT Pub. No.: WO2010/013962
PCT Pub. Date: Feb. 4, 2010

(65) Prior Publication Data
US 2011/0128883 A1    Jun. 2, 2011

Related U.S. Application Data

(60) Provisional application No. 61/084,631, filed on Jul. 30, 2008, provisional application No. 61/085,871, filed on Aug. 3, 2008, provisional application No. 61/099,210, filed on Sep. 23, 2008.

(51) Int. Cl.
*H04L 12/26* (2006.01)
*H04B 7/26* (2006.01)
(Continued)

(52) U.S. Cl.
CPC .............. *H04B 7/2606* (2013.01); *H04B 7/155* (2013.01); *H04W 84/047* (2013.01); *H04W 72/042* (2013.01)

(58) Field of Classification Search
None
See application file for complete search history.

(56) References Cited

U.S. PATENT DOCUMENTS

2003/0063620 A1    4/2003  You et al.
2007/0081502 A1    4/2007  Lee et al.
(Continued)

FOREIGN PATENT DOCUMENTS

CN    1409562      4/2003
CN    101106807    1/2008
(Continued)

OTHER PUBLICATIONS

Motorola, PDCCH Search Space Assignment Hashing Function, R1-081672, Apr. 4, 2008.*
(Continued)

*Primary Examiner* — Hassan Kizou
*Assistant Examiner* — Tejis Daya
(74) *Attorney, Agent, or Firm* — McKenna Long & Aldridge LLP

(57) ABSTRACT

A method for operating a relay station in a wireless communication system includes: obtaining information regarding assigned subframes among a plurality of subframes; monitoring a PDCCH (Physical Downlink Control Channel) carrying information regarding a radio resource allocation within the assigned subframes; and receiving data from a base station on the basis of the radio resource allocation of the monitored PDCCH. The relay station may operate to guarantee compatibility with an existing terminal in a wireless communication system. Also, a method for assigning radio resources between a base station and the relay station is defined.

9 Claims, 19 Drawing Sheets

(51) Int. Cl.
*H04B 7/155* (2006.01)
*H04W 72/04* (2009.01)
*H04W 84/04* (2009.01)

(56) References Cited

U.S. PATENT DOCUMENTS

| | | | |
|---|---|---|---|
| 2007/0280292 A1* | 12/2007 | Lee et al. | 370/468 |
| 2008/0080423 A1 | 4/2008 | Kolding et al. | |
| 2008/0081626 A1 | 4/2008 | Choi et al. | |
| 2008/0137584 A1* | 6/2008 | Oh et al. | 370/315 |
| 2008/0232284 A1* | 9/2008 | Dalsgaard et al. | 370/310 |
| 2009/0074090 A1* | 3/2009 | Xu et al. | 375/260 |
| 2009/0168922 A1* | 7/2009 | Malladi et al. | 375/316 |
| 2010/0046413 A1* | 2/2010 | Jin et al. | 370/315 |
| 2011/0222428 A1* | 9/2011 | Charbit et al. | 370/252 |

FOREIGN PATENT DOCUMENTS

| | | |
|---|---|---|
| JP | 2008-022558 A | 1/2008 |
| WO | WO2007/053954 | 5/2007 |
| WO | WO 2008/084624 A1 | 7/2008 |
| WO | WO2010/006285 | 1/2010 |

OTHER PUBLICATIONS

Samsung, Restriction of PDCCH monitoring set, R1-072220, May 7-11, 2007.*
Ericcson, PDCCH blind decoding—Outcome of offline discussions, R1-081101, Feb. 11, 2008.*
Samsung, UE-specific search space, R1-081212, Apr. 4, 2008.*
"3rd Generation Partnership Project; Technical Specification Group Radio Access Network; Evolved Universal Terrestrial Radio Access (E-UTRA); Physical Channels and Modulation"; 3GPP TS 36. 211 V8. 2. 0., section 6.8 (Mar. 2008).
"Search Space Definition: Reduced PDCCH Blind Detection for Split PDCCH Search Space", 3GPP Draft; R1-073996—Split Search Space for Reduced PDCCH Blind Detection, 3rd Generation Partnership Project (3GPP), Mobile Competence Centre ; RAN WG1, Shanghai, China; Oct. 3, 2007, XP050107552.

* cited by examiner

RELAY STATION IN RADIO COMMUNICATION SYSTEM AND OPERATING METHOD FOR THE RELAY STATION

This application is a National Stage Entry of International Application No. PCT/KR2009/004265, filed Jul. 30, 2009, and claims the benefit of U.S. Provisional Application Ser. No. 61/084,631, filed Jul. 30, 2008, U.S. Provisional Application Ser. No. 61/085,871, filed Aug. 3, 2008, U.S. Provisional Application Ser. No. 61/099,210, filed Sep. 23, 2008, all of which are hereby incorporated by reference in their entirety herein.

TECHNICAL FIELD

The present invention relates to wireless communication and, more particularly, to a relay station in a wireless communication system and a method for operating a relay station.

BACKGROUND ART

ITU-R (International Telecommunication Union Radio communication sector) is standardizing an IMT (International Mobile Telecommunication)-Advanced, a next-generation mobile communication system following the $3^{rd}$ generation mobile communication system. The IMT-Advanced aims to support IP (Internet Protocol)-based multimedia services at a data transfer rate of 1 Gbps in a stationary and low-speed movement state and at a data transfer rate of 100 Mbps in a high speed movement state.

3GPP ($3^{rd}$ Generation Partnership Project) is preparing a system standard satisfying the requirements of IMT-Advanced, which is LTE (Long Term Evolution)-Advanced improving LTE which uses OFDMA (orthogonal frequency division multiple access)/SC-FDMA (single carrier-frequency division multiple access). The LTE-Advanced is one of potential candidates for IMT-Advanced. A major technique of the LTE-Advanced includes a relay station technique.

A relay station, a device relaying a signal between a base station (BS) and a user equipment (UE), is used to extend a cell coverage of a wireless communication system and improve throughput.

A 3GPP LTE system was designed without taking a relay station into consideration. In order to operate the relay station, various matters such as synchronization with the BS, a radio resource allocation, and the like, must be considered. The LTE-A system is designed based on backward compatibility with an LTE system, so in order for the relay station to be introduced to the LTE-A system, an operation with a UE supporting only the existing LTE needs to be considered.

DISCLOSURE

Technical Problem

Therefore, an object of the present invention is to provide a method for operating a relay station in a wireless communication system including a relay station, and a relay station using the same.

Another object of the present invention is to provide a method and apparatus for assigning radio resources of a backhaul link between a relay station and a base station.

Technical Solution

To achieve the above objects, there is provided a method for operating a relay station in a wireless communication system, including: obtaining information regarding assigned subframes among a plurality of subframes; monitoring a PDCCH (Physical Downlink Control Channel) carrying information regarding a radio resource allocation within the assigned subframes; and receiving data from a base station on the basis of the radio resource allocation of the monitored PDCCH.

When data is received from the base station through a frequency band in the assigned subframes, a relay station may not transmit data to a user equipment (UE) through the frequency band in the assigned subframes.

The information regarding the assigned subframes may be information regarding subframes at fixed positions within a certain number of contiguous radio frames.

The information regarding the radio resource allocation may be information regarding a frequency band at a fixed position within the subframes at the fixed positions.

The information regarding the radio resource allocation may be information regarding a frequency band determined for each of the subframes at the fixed positions.

The information regarding the assigned subframes may be obtained through a portion of system information or an RRC (Radio Resource Control) message received from the base station.

A unique identifier of the relay station may be masked on a CRC (Cyclic Redundancy Check) of the monitored PDCCH.

In monitoring the PDCCH, the PDCCH may be monitored by CCE (Control Channel Element) set on the basis of a search start point.

The search start point may be defined on the basis of the unique identifier of the relay station.

The search start point may be fixed.

To achieve the above objects, there is also provided a relay station including: an RF unit configured to transmit and receive a radio signal; and a processor connected to the RF unit, wherein the processor obtains information regarding assigned subframes among a plurality of subframes, monitors a PDCCH (Physical Downlink Control Channel) carrying information regarding a radio resource allocation within the assigned subframes, and receives data from a base station on the basis of the radio resource allocation of the monitored PDCCH.

Advantageous Effects

According to exemplary embodiments of the present invention, a relay station may operate to guarantee compatibility with an existing UE. Also, a method for assigning radio resources between a base station and the relay station is defined.

MODE FOR INVENTION

LTE (Long Term Evolution) according to 3GPP (3rd Generation Partnership Project), a part of E-UMTS (Evolved-UMTS) using E-UTRAN (Evolved-Universal Terrestrial Radio Access Network), employs OFDMA (Orthogonal Frequency Division Multiple Access) in downlink and SC-FDMA (Single Carrier-Frequency Division Multiple Access) in uplink. LTE-A (Advanced) is an evolved LTE. The LTE-A is an advanced technique allowing for an application of carrier aggregation in downlink and uplink and allowing for an application of a clustered DFT-s-OFDMA having the characteristics that when a DFT output signal sample sequence is mapped to an input unit of IFFT (Inverse Fast Fourier Transform) in the event of a UE transmission in addition to an existing SC-FDMA in uplink, one or more DFT output signal samples are mapped such that they are not contiguous in units of subgroup of the DFT output signal samples. Hereinafter, the 3GPP LTE/LTE-A will be mainly described to clarify the description of the present invention, but a technical feature of the present invention is not limited thereto.

Figure 1:
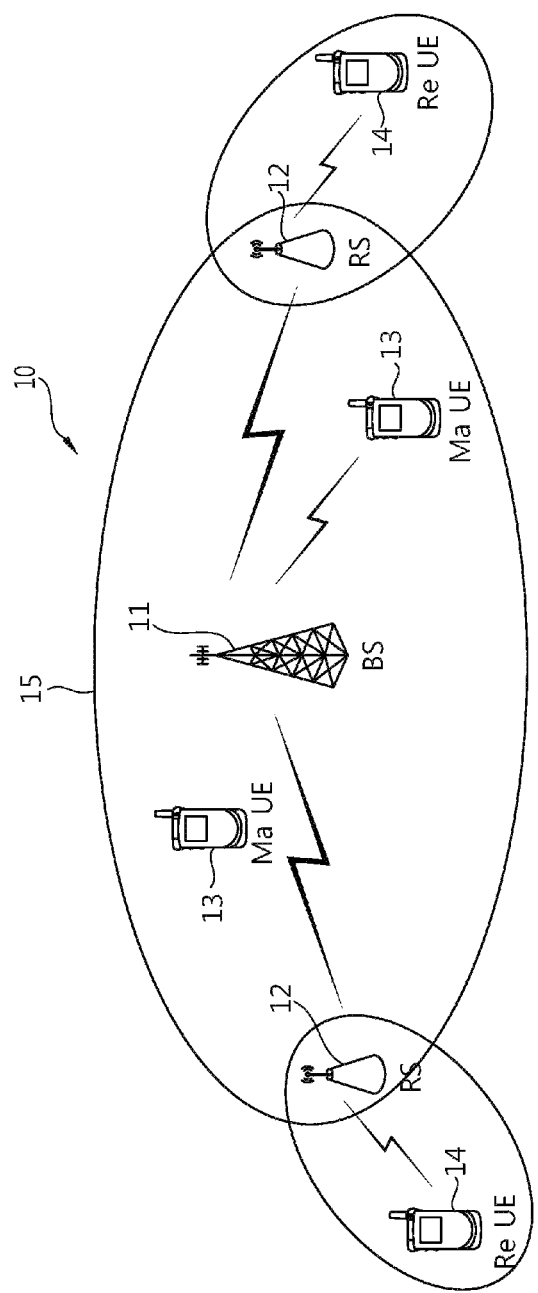
FIG. 1 is a view illustrating a wireless communication system including relay stations (RSs).

FIG. 1 is a view illustrating a wireless communication system including relay stations (RSs).

With reference to FIG. 1, a wireless communication system 10 including relay stations include at least one base station (BS) 11. Each BS 11 provides a communication service to a particular geographical area 15 generally called a cell. The cell may be divided into a plurality of areas, and each area is called a sector. One or more cells may exist in a single base station. In general, the BS 11 refers to a fixed station communicating with a UE 13 and may be called by other terminologies such as eNB (evolved NodeB), BTS (Base Transceiver System), AP (Access Point), AN (Access Network), and the like. The BS 11 may perform functions such as connectivity between the RS 12 and a UE 14, management, controlling, and resource allocation.

The RS 12, which may be called by other terminologies such as an RN (Relay Node), a repeater, a relay, and the like, refers to a device relaying a signal between the BS 11 and the UE 14. The RS 12 may use any methods, such as AF (Amplify and Forward) and DF (Decode and Forward), as a relay method, and the technical concept of the present invention is not limited thereto. The RS may have a different cell ID from that of the BS, and may transmit a unique synchronization signal and/or unique reference signal. Also, the RS may have a majority of functions of the BS 11, such as performing a unique scheduling function, and the like.

The UEs 13 and 14 may be fixed or mobile and may be called by other names such as MS (Mobile Station), UT (User Terminal), SS (Subscriber Station), wireless device, PDA (Personal Digital Assistant), wireless modem, handheld device, AT (Access Terminal), and the like. Hereinafter, macro UE (Ma UE) 13 is a terminal directly communicating with the BS 11 and the relay station UE (Re UE) 14 refer to a terminal communicating with an RS. Although the macro UE 13 is within the cell of the BS 11, it may communicate with the BS through the RS 12 in order to improve a transfer rate according to a diversity effect. In the following description, a UE refers to the Re UE, unless otherwise specified.

In the following description, downlink refers to communication from the BS 11 to the Ma UE 13 and uplink refers to communication from the Ma UE 13 to the BS. A backhaul link refers to a link between the BS 11 and the RS 12, a backhaul downlink refers to communication from the BS 11 to the RS 12, and a backhaul uplink refers to communication from the RS 12 to the BS 11. An access link refers to a link between the RS 12 and the Re UE 14, an access downlink refers to communication from the RS 12 to the Re UE 14, and an access uplink refers to communication from the Re UE 14 to the RS 12.

The RS may be classified into an L1 relay, an L2 relay, and an L3 relay depending on how many functions it performs. The L1 relay performs a simple function of a repeater, amplifies a signal from a source station, and relays it to a destination station. The L2 relay may be expressed as DF (Decode-and-Forward). The L2 relay decodes a received signal and then transmits re-encoded signal to the destination station. The L2 relay is advantageous in that noise is not amplified and transmitted, but a transmission delay may disadvantageously occur due to decoding in the RS. The L3 relay, which is also called self-backhauling, transmits an IP (Internet Protocol) packet. The L3 relay includes an RRC (Radio Resource Control) layer, which means an RS playing a role like a small base station. As for the L3 relay, the RS can control its cell. Hereinafter, the RS can be applicable to any type of the L1/L2/L3, and the present invention is not limited thereto.

The wireless communication system 10 may be able to support TDD (Time Division Duplex) or FDD (Frequency Division Duplex). The FDD is a scheme of performing communication through an uplink band and a downlink band discriminated in a frequency domain, and TDD is a scheme of performing communication an uplink transmission and a downlink transmission at a mutually different time through a single frequency band. In the FDD, the RS may use a downlink band (or a first frequency band) in the backhaul downlink and the access downlink, and an uplink band (or a second frequency band) in the backhaul uplink and the access uplink. The frequency band, which is also called a carrier band, may correspond to a single carrier. Each frequency band is defined as a center frequency and a bandwidth.

The RS may be classified into an in-band RS and an out-of-band RS depending on a frequency band communicating with a BS or a UE. The in-band RS uses the same frequency band as that used for communication between the BS and the macro UE, and the out-of-band RS uses a frequency band different from that used for communication between the BS and the macro UE. The use of the out-of-band RS requires additional frequency resource but advantageously simplifies the operation of the RS. Hereinafter, it is assumed that the RS is the in-band RS, but the possibility that limited techniques and processes are applied to the out-of-band RS is not ruled out.

Figure 2:
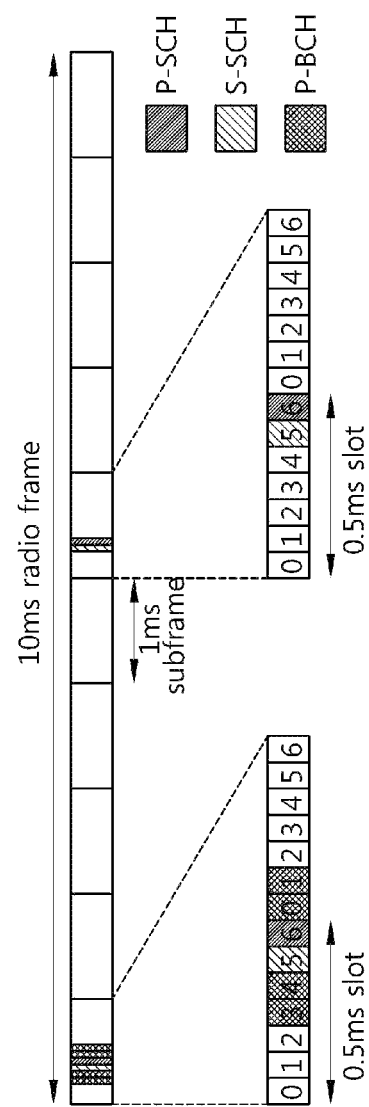
FIG. 2 is a view illustrating an example of a radio frame structure in 3GPP LTE.

FIG. 2 is a view illustrating an example of a radio frame structure in 3GPP LTE. This may refer to section 6 of "Evolved Universal Terrestrial Radio Access (E-UTRA); Physical Channels and Modulation (Release 8)" in 3GPP TS 36.211 V8.3.0 (2008-5).

With reference to FIG. 2, a radio frame includes ten subframes, and one subframe may include two slots. One slot may include a plurality of OFDM symbols in a time domain. The number of OFDM symbols included in one slot may be variably determined according to the structure of a CP (Cyclic Prefix). In a radio frame using a normal CP size, one slot may include seven OFDM symbols. In a 10 ms radio frame, when OFDM symbols are 2048 Ts, a normal CP size may be 144 Ts (Ts=1/(15000*2048) sec). Meanwhile, in a radio frame using an extended CP size, one slot may include six OFDM symbols.

In an FDD mode, a P-SCH (Primary Synchronization Channel) is positioned at the final OFDM symbol of $0^{th}$ slot and that of the $10^{th}$ slot (Meanwhile, in a TDD mode, the P-SCH is positioned at third OFDM symbols of first and sixth subframes). The same PSS (Primary Synchronization Signal) is transmitted through two P-SCHs. The P-SCH is used to obtain an OFDM symbol synchronization, time domain synchronization such as slot synchronization and/or frequency domain synchronization. A ZC (Zadoff-Chu) sequence may be used as the PSS, and there is at least one PSS in the wireless communication system.

In the FDD mode, an S-SCH (Secondary Synchronization Channel) is positioned at immediately previous OFDM symbols of the last OFDM symbols of the $0^{th}$ slot and $10^{th}$ slot (Meanwhile, in the TDD mode, the S-SCH is positioned at the last OFDM symbols of the first and eleventh slots). The S-SCH and the P-SCH may be positioned at contiguous OFDM symbols. Different SSS (Secondary Synchronization Signals) are transmitted through two S-SCHs. The S-SCH is used to obtain frame synchronization and/or a CP configuration of a cell, namely, usage information of a normal CP or an extended CP.

The P-SCH and the S-SCH are used to obtain physical layer cell identities (IDs). The physical layer cell IDs may be denoted as a group of 168 physical layer cell IDs and three physical layer IDs belonging to each physical layer cell ID group. Namely, the entire physical layer cell IDs are 504, which are denoted as a group of physical layer cell IDs ranging from 0 to 167 and a physical layer ID ranging from 0 to 2 included in each of the physical layer cell IDs of the group. Three ZC sequence root indexes denoting physical layer IDs may be used in the P-SCH, and 168 m-sequence indexes denoting the group of the physical layer cell IDs may be used in the S-SCH.

A P-BCH (Physical-Broadcast Channel) is positioned at the $0^{th}$ subframe in the radio frame. The P-BCH occupies, starting from $3^{rd}$ OFDM symbol (OFDM symbol starts from $0^{th}$ OFDM symbol), of the $0^{th}$ subframe, four OFDM symbols, excluding the P-SCH and the S-SCH. Alternatively, the P-BCH may be transmitting by using the first four OFDM symbols of the second slot of the $0^{th}$ subframe. The P-BCH is used to obtain basic system configuration information of a corresponding base station. The P-BCH may have a period of 40 ms.

Figure 3:
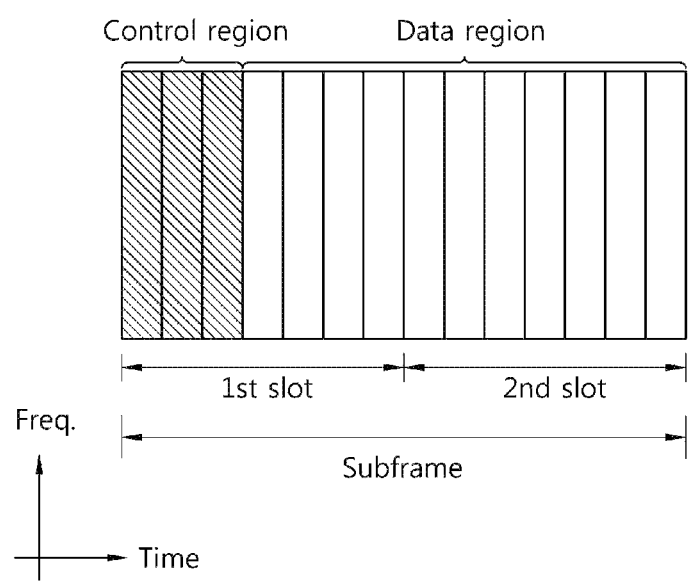
FIG. 3 is a view illustrating the structure of a downlink subframe in 3GPP LTE.

FIG. 3 is a view illustrating the structure of a downlink subframe in 3GPP LTE. The subframe includes two slots in a time domain. Front maximum three OFDM symbols of the first slot in the subframe are a control region to which control channels are assigned, and the other remaining OFDM symbols are a data region to which a PDSCH (Physical Downlink Shared Channel) is assigned.

Downlink control channels used in the 3GPP LTE may include a PCFICH (Physical Control Format Indicator Channel), a PDCCH (Physical Downlink Control Channel), a PHICH (Physical Hybrid-ARQ Indicator Channel), and the like. The PCFICH transmitted in the first OFDM symbol carries information regarding the number of OFDM symbols (namely, the size of the control region) used for a transmission of control channels in the subframe. The control information transmitted via the PDCCH is called DCI (Downlink Control Information). The DCI indicates uplink resource allocation information, downlink resource allocation information, an uplink transmission power control command with respect to certain UE groups, and the like. The PHICH carries an ACK (Acknowledgement)/NACK (Not-Acknowledgement) signal with respect to an uplink HARQ (Hybrid Automatic Repeat Request). Namely, the ACK/NACK signal with respect to uplink data transmitted by a UE is transmitted via the PHICH.

The PDCCH, a downlink physical channel, will now be described.

The PDCCH may carry a resource allocation and transmission format (which is also called a downlink grant), resource allocation information of PUSCH (which is also called an uplink grant), a set of transmission power control commands regarding individual UEs of a certain UE group, an activation of a VoIP (Voice over Internet Protocol), and the like. A plurality of PDCCHs may be transmitted in the control region, and a UE may monitor the plurality of PDCCHs. The PDCCH includes a CCE (Control Channel Elements) or an aggregation of some contiguous CCEs. The PDCCH made up of one CCE or an aggregation of some contiguous CCEs may be transmitted via the control region after undergoing sub-block interleaving. The CCE is a logical assignment unit used to provide a coding rate according to a state of a radio channel to the PDCCH. The CCE corresponds to a plurality of resource elements groups. The format of the PDCCH and an available number of bits of the PDCCH are determined according to the relation between the number of CCEs and the coding rate provided by the CCEs.

The control information transmitted through the PDCCH is called DCI (Downlink Control Information). Table 1 below shows the DCI according to a DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, DCI formats 1 and 2 indicate downlink resource allocation information, DCI formats 3 and 3A indicate an uplink TPC (Transmit Power Control) command regarding certain UE groups.

A BS determines a PDCCH format according to the DCI desired to be transmitted to the UE, and attaches a CRC (Cyclic Redundancy Check). A unique identifier (which is called an RNTI (Radio Network Temporary Identifier)) is masked according to the owner or the purpose of the PDCCH in the CRC. When the PDCCH is used for a particular UE, a unique identifier of the UE, e.g., a C-RNTI (Cell-RNTI) may be masked in the CRC. Alternatively, when the PDCCH is used for a paging message, a paging indication identifier, e.g., a P-RNTI (Paging-RNTI) may be masked in the CRC. When the PDCCH is used for system information, a system information identifier, e.g., an SI-RNTI (system information-RNTI) may be masked in the CRC. An RA-RNTI (random access-RNTI) may be masked in the CRC in order to indicate a random access response, a response to a transmission of a random access preamble of the UE.

The operation of the RS in the wireless communication system will now be described.

In order for the RS to operate in the wireless communication system, the following matters must be considered. This considers the in-band RS.

(1) Compatibility with an existing (conventional) terminal: There should be no additional change in a UE supporting only the existing LTE.

(2) Whether to simultaneously perform reception and transmission: It refers to whether or not the RS must be allowed for simultaneously performing transmission and reception in the same band.

(3) Whether to perform a simultaneous reception or simultaneous transmission: It refers to whether or not the RS receives data from the BS (or transmit data to the BS) in a first band and it can simultaneously receive data from the UE (or transmit data to the UE) in a second band.

The foregoing conditions may be classified into four RFS (Relay Frame Structure) types as shown in Table 2 below.

TABLE 2

| Type | RFS1-A | RFS1-B | RFS1-C | RFS1-D |
| --- | --- | --- | --- | --- |
| Whether to simultaneously perform transmission and reception | Unavailable | | Available | |
| Whether to perform simultaneous reception or simultaneous transmission | Unavailable | Available | Unavailable | Available |

Figure 4:
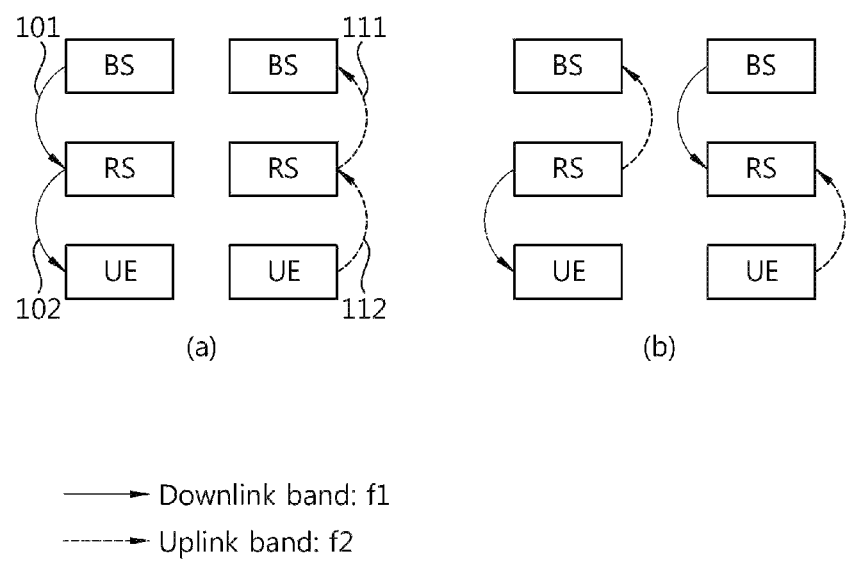
FIG. 4 is a view illustrating an operation of the RS.

FIG. 4 is a view illustrating an operation of the relay stations. FIG. 4(a) shows the operation of simultaneously performing transmission and reception by the RS in the same frequency band, and FIG. 4(b) shows the operation of performing simultaneous transmission and simultaneous reception by the RS in different frequency bands.

With reference to FIG. 4(a), the RS receives a signal from the BS through a first frequency band f1 (101) and, at the same time, the RS transmits a signal to the UE through the first frequency band f1. This means that the backhaul downlink reception and the access downlink transmission can be simultaneously performed. The RS simultaneously transmits a signal to the BS through a second frequency band f2 and simultaneously receives a signal from the UE 112. This means that the backhaul uplink transmission and the access uplink reception can be simultaneously performed. Namely, the RS simultaneously receives and transmits signals in the same frequency band.

With reference to FIG. 4(b), the RS simultaneously transmits a signal to the BS through the uplink frequency band f2 in the backhaul link and transmits a signal to the UE through the downlink frequency band f1 in the access link. Or, the RS receives a signal from the BS through the downlink frequency band f1 and receives a signal from the UE through the uplink frequency band f2 in the access link. Namely, the RS simultaneously transmits signals to the BS and the UE or receives signals from the BS and the UE in different frequency bands.

Depending on whether or not the RS can perform the operations of FIGS. 4(a) and 4(b), the structure of a radio frame applicable to the RS, a timing of transmission/reception subframe at the RS, a downlink synchronization performing process of the RS, and the like, may vary. Thus, in the present invention, four types of operations of the RS are proposed as follows.

I. Type RFS1-A

Figure 5:
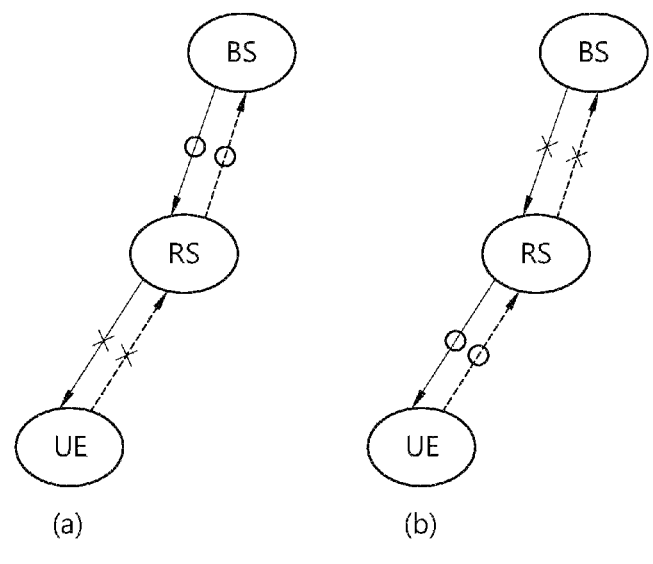
FIG. 5 is a view illustrating an operation of the RS in a type of RFS1-A.

FIG. 5 is a view illustrating an operation of the RS in a type of RFS1-A. With reference to FIG. 5(a), the RS may transmit a signal to the BS through the backhaul uplink during a time interval in which the RS receives a signal from the BS through the backhaul downlink. Also, the RS can receive a signal from the BS through the backhaul downlink in the time interval in which the RS transmits a signal to the BS through the backhaul uplink. In this case, the RS cannot transmit and receive a signal to and from the UE through the access downlink and the access uplink. With reference to FIG. 5(b), the RS may receive a signal during a time interval in which the RS transmits a signal to the UE through the access downlink. Also, the RS may transmit a signal to the UE through the access downlink during the time interval in which the RS receives a signal from the UE. In this case, the RS cannot transmit and receive a signal to and from the BS through the backhaul downlink and the backhaul uplink. Namely, the RS cannot transmit a signal simultaneously when it receives a signal in the same frequency band, and cannot simultaneously transmit nor receive a signal to or from the BS and the UE in different frequency bands.

I-1. Radio Frame Structure

Figure 6:
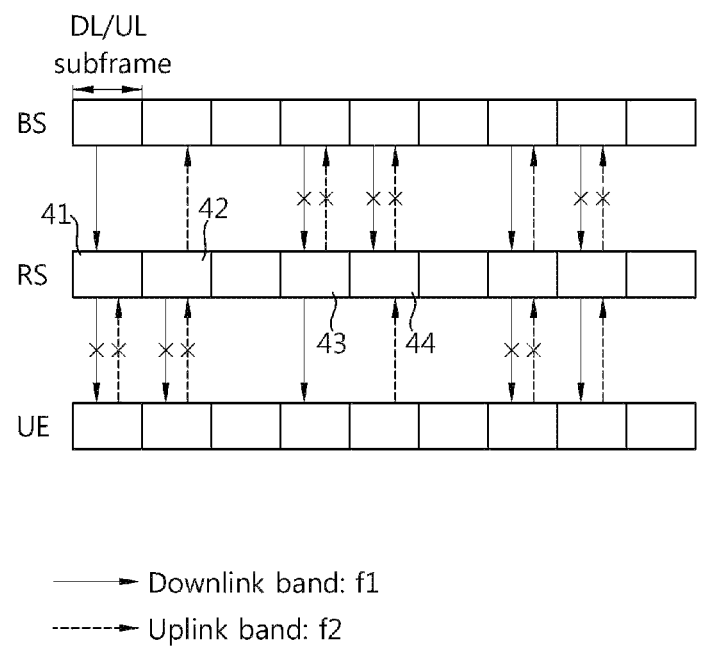
FIG. 6 is a view illustrating a transmitting/receiving operation of signals according to subframes of a radio frame.

FIG. 6 is a view illustrating a transmitting/receiving operation of signals according to subframes of a radio frame.

With reference to FIG. 6, the RS cannot communicate with the UE in a subframe 41 during which the RS receives a signal from the BS. Namely, a signal transmission and reception through both access uplink and access downlink are limited. Also, the RS cannot communicate with the UE even in a subframe 42 during which the RS transmits a signal to the BS.

In subframes 43 and 44 during which the RS communicates with the UE, the RS cannot communicate with the BS. Namely, a signal transmission and reception through the backhaul uplink and the backhaul downlink are limited. Also, the subframe 41 during which the RS receives a signal in the downlink frequency band and the subframe 43 during which the RS transmits a signal in the downlink frequency band are exclusively discriminated.

Figure 7:
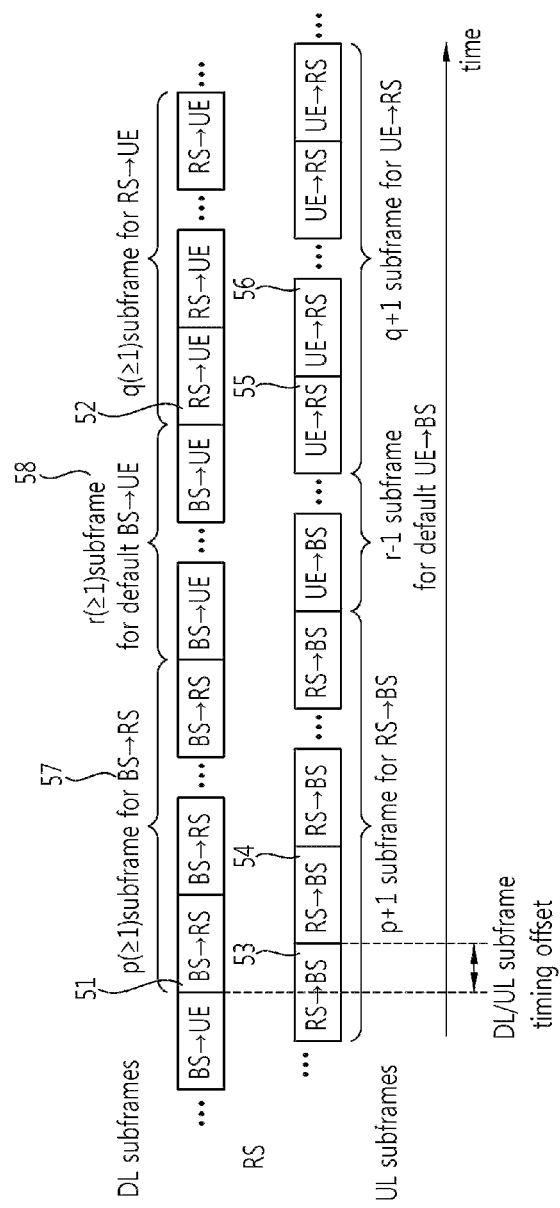
FIG. 7 is a view illustrating a transmitting/receiving operation of signals of the RS in uplink subframes according to downlink subframes when a timing offset value is greater than an OFDM symbol CP length in downlink subframes and uplink subframes with respect to the type of RFS1-A.

FIG. 7 is a view illustrating a transmitting/receiving operation of signals of the RS in uplink subframes according to downlink subframes when a timing offset value is greater than an OFDM symbol CP length in downlink subframes and uplink subframes.

With reference to FIG. 7, a downlink subframe during which the RS receives a signal from the BS or a downlink subframe during which the RS transmits a signal to the UE may temporally overlap with two uplink subframes due to a timing offset value. Namely, a downlink subframe 51 may temporally overlap with two uplink subframes 53 and 54, and another downlink subframe 52 may temporally overlap with the other two uplink subframes 55 and 56. In this case, the two uplink subframes 53 and 54 overlapping with downlink subframe 51 during which the RS receives a signal from the BS are not assigned for the RS to receive a signal from the UE, and preferably, the RS transits a signal to the BS as necessary. Or, the two uplink subframes 55 and 56 overlapping with the downlink subframe 52 during which the RS transmits a signal to the UE are not assigned to transmit a signal to the BS, and, preferably, the RS receives signal from the UE if necessary.

When a plurality of downlink subframes during which the RS receives a signal from the BS or a plurality of downlink subframes during which the RS transmits a signal to the UE are contiguous, r (r is an integer greater than 1) number of downlink subframes following the last downlink subframe may be assigned only for the BS to transmit a signal to the UE, rather than being assigned for the RS's transmission and reception. Namely, in FIG. 7, when p number of downlink subframes 57 are assigned for the RS to receive a signal from the BS, r number of downlink subframes 58 following the p number of downlink subframes 57 may be assigned for the BS to transmit a signal to the UE. Also, the r number of downlink subframes 58 may be assigned by a certain number of times, e.g., only one, in n number of radio frames. This aims at minimizing the assignment of the downlink subframes not related to a transmission and reception of the RS.

The RS may transmit a signal to the BS during all the uplink subframes which may partially temporally overlap with downlink subframes during which the RS receives a signal from the BS. Also, the RS may receive a signal from the UE during all the uplink subframes which may partially temporally overlap with the downlink subframes during which the RS transmits a signal to the UE.

Figure 8:
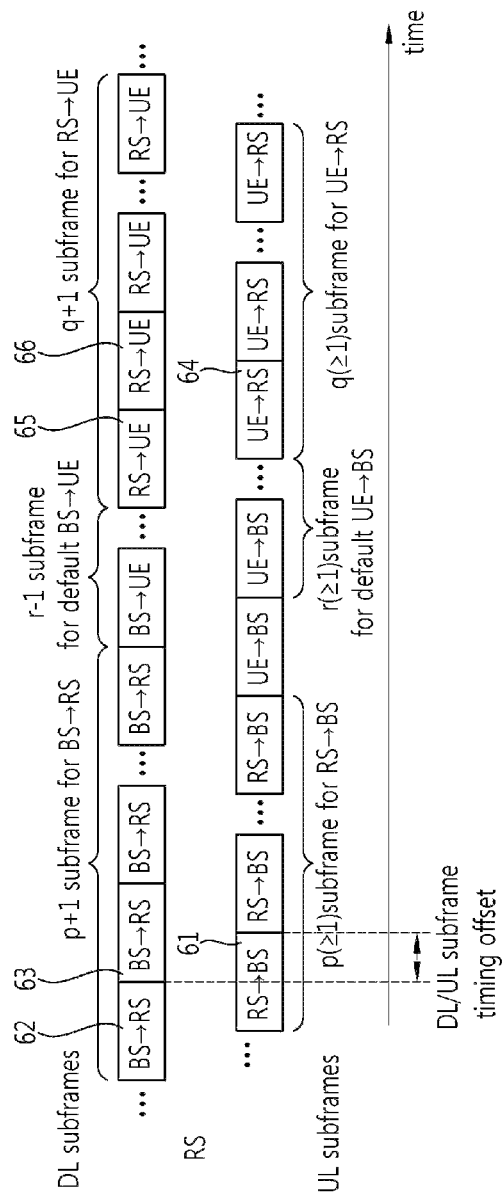
FIG. 8 is a view illustrating a transmitting/receiving operation of signals of the RS in downlink subframes according to uplink subframes when a timing offset value is greater than the OFDM symbol CP length in downlink subframes and uplink subframes with respect to the type of RFS1-A.

FIG. 8 is a view illustrating a transmitting/receiving operation of signals of the RS in downlink subframes according to uplink subframes when a timing offset value is greater than the OFDM symbol CP length in downlink subframes and uplink subframes.

With reference to FIG. 8, preferably, the RS receives a signal from the BS during two downlink subframes 62 and 63 which overlap with an uplink subframe 61 during which the RS transmits a signal to the BS. Or, preferably, the RS transmits a signal to the UE during two downlink subframes 65 and 66 which overlap with an uplink subframe 64 during which the RS receives a signal from the UE. When a plurality of uplink subframes during which the RS transmits a signal to the BS or a plurality of uplink subframes during which the RS receives a signal from the UE are contiguous, r (r is an integer greater than 1) number of uplink subframes following the last uplink subframe may be assigned only for the UE to transmit a signal to the BS, rather than being assigned for the RS's transmission and reception.

The RS may receive a signal from the BS during all the downlink subframes which may partially temporally overlap with uplink subframes during which the RS transmits a signal to the BS. Also, the RS may transmit a signal to the UE during all the downlink subframes which may partially temporally overlap with the uplink subframes during which the RS receives a signal from the UE.

I-2. P/S-SCH and P-BCH Timing of RS

The RS may transmit its P-SCH, S-SCH, and P-BCH in the same frequency domain or in a different frequency domain by setting a certain number of subframe offsets with a subframe including the P-SCH, S-SCH, and P-SCH according to circumstances, transmitted from the BS. In order to provide such subframe offsets, like the BS does, the RS may set the first subframe (this subframe transmits also the P-BCH) and the sixth subframe of a 10 ms radio frame, as subframes for transmitting the P-SCH and the S-SCH and shift (forward or backward) a timing of the 10 ms radio frame to a certain considered offset by subframe with a timing of the 10 ms radio frame, or alternatively, the RS may designate the position of the subframe transmitting the P-SCH and the S-SCH within the 10 ms radio as a position of a different subframe, while maintaining the five subframe intervals, to thus provide the offset.

Or, the RS may set offsets by a certain number of OFDM symbols in the same subframe as the subframe including the P-SCH, the S-SCH, and the P-BCH transmitted from the BS, and transmit the P-SCH, the S-SCH, and the P-BCH of the RS in the same frequency domain or in a different frequency domain.

Or, the RS may set an offset value in the frequency domain, rather than setting it in the time domain with the subframe including the P-SCH, the S-SCH, and the P-BCH transmitted from the BS. Or, the RS may transmit the P-SCH, the S-SCH, and the P-BCH by using a code maintaining orthogonality with signals included in the P-SCH, the S-SCH, and the P-BCH transmitted from the BS, rather than setting an offset value in the time domain and the frequency domain.

II. Type RFS1-B

Figure 9:
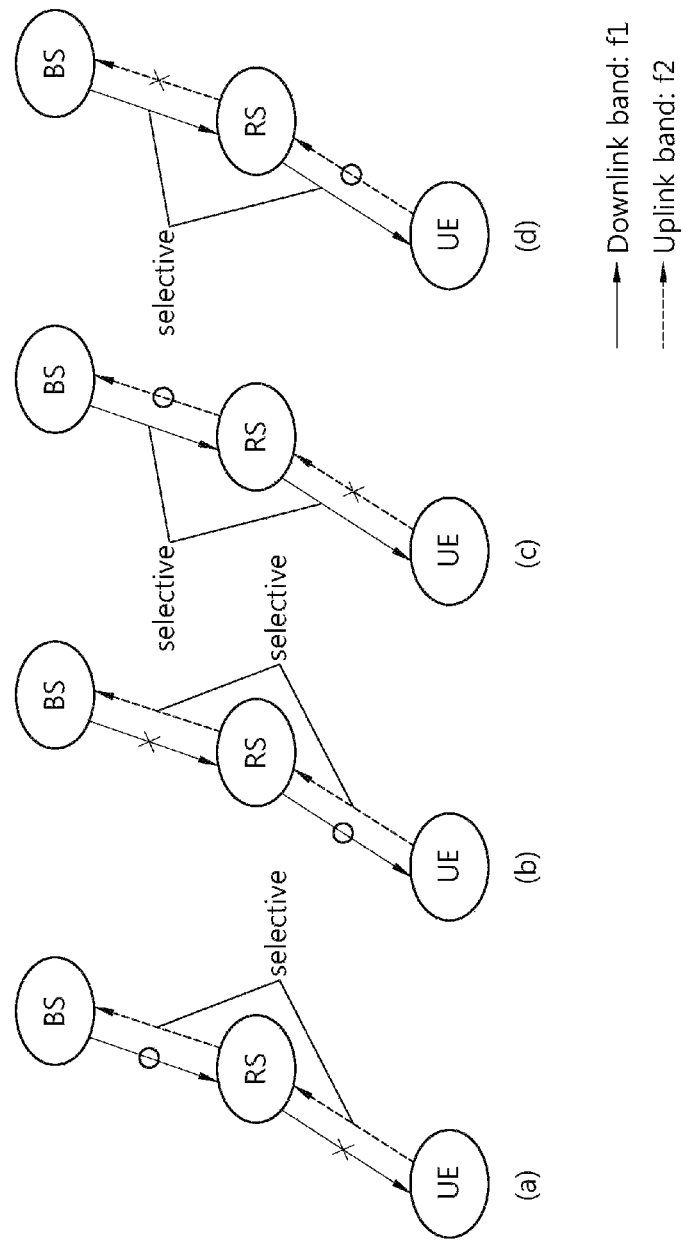
FIG. 9 is a view illustrating an operation of the RS in a type of RFS1-B.

FIG. 9 is a view illustrating an operation of the RS in a type of RFS1-B. With reference to FIG. 9(*a*), when the RS receives a signal from the BS through the backhaul downlink, it cannot transmit a signal to the UE through the access downlink. In this case, however, the RS may selectively transmit or receive a signal through the backhaul uplink or the access uplink. With reference to FIG. 9(*b*), when the RS transmits a signal to the UE through the access downlink, it cannot receive a signal from the BS through the backhaul downlink. In this case, however, the RS may selectively transmit or receive a signal through the backhaul uplink or the access uplink. With reference to FIG. 9(c), when the RS transmits a signal to the BS through the backhaul uplink, it cannot receive a signal from the UE through the access uplink. In this case, however, the RS may selectively receive or transmit a signal through the backhaul downlink or the access downlink. With reference to FIG. 9(d), when the RS receives a signal from the UE through the access uplink, it cannot transmit a signal to the BS through the backhaul uplink. In this case, however, the RS may selectively receive or transmit a signal through the backhaul downlink or the access downlink.

II-1. Radio Frame Structure

Figure 10:
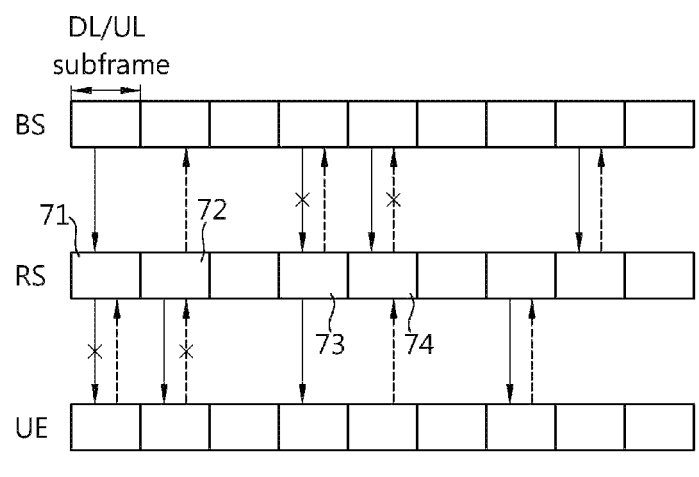
FIG. 10 is a view illustrating a transmitting/receiving operation of signals according to subframes when the RS sets a timing offset value as 0 or as a value within the OFDM symbol CP length in downlink subframes and uplink subframes with respect to the type of RFS1-B.

FIG. 10 is a view illustrating a transmitting/receiving operation of signals according to subframes when the RS sets a timing offset value as 0 or as a value within the OFDM symbol CP length in downlink subframes and uplink subframes.

With reference to FIG. 10, the RS cannot transmit a signal to the UE by using the same frequency band during a subframe 71 in which the RS receives a signal of the downlink frequency band. In this case, however, the RS may receive a signal of uplink frequency band from the UE. The RS cannot receive a signal from the UE by using the same frequency band during a subframe 72 in which the RS transmits a signal of uplink frequency band to the BS. In this case, however, the RS may transmit a signal of downlink frequency band to the UE.

The RS may transmit a signal of uplink frequency band to the BS during a subframe 73 in which the RS transmits a signal of downlink frequency band to the UE. Also, the RS may receive a signal of downlink frequency band from the BS during a subframe 74 in which the RS receives a signal of uplink frequency band from the UE.

II-2. P/S-SCH and P-BCH Timing of RS

The RS may transmit the P-SCH, the S-SCH, and the P-BCH of the RS during the same subframe as the subframe including the P-SCH, the S-SCH, and the P-BCH transmitted by the BS. The RS may have a cell ID different from that of the BS. The UE may receive the P-SCH, the S-SCH, and the P-BCH from the BS and the RS during the same OFDM symbol of the same subframe and recognize a downlink synchronization process of the RS through the cell ID of the RS.

The RS is limited to receive a signal from the BS during the downlink subframe in which the BS and the RS transmits the P-SCH, the S-SCH, and the P-BCH to the UE. This aims not to limit the RS's transmission of the signal to the UE.

In a scheme allowing certain RS to receive the downlink P-SCH, S-SCH, and P-BCH of the BS through the backhaul downlink while transmitting the P-SCH, S-SCH, and P-BCH through the access downlink, the RS may transmit its P-SCH, S-SCH, and P-BCH in the same frequency domain or in a different frequency domain by setting a certain number of subframe offsets with a subframe including the P-SCH, S-SCH, and P-SCH according to circumstances, transmitted from the BS. In order to provide such subframe offsets, like the BS does, the RS may set the first subframe (this subframe transmits also the P-BCH) and the sixth subframe of a 10 ms radio frame, as subframes for transmitting the P-SCH and the S-SCH and shift (forward or backward) a timing of the 10 ms radio frame to a certain considered offset by subframe with a timing of the 10 ms radio frame, or alternatively, the RS may designate the position of the subframe transmitting the P-SCH and the S-SCH within the 10 ms radio as a position of a different subframe, while maintaining the five subframe intervals, to thus provide the offset.

Or, the RS may set offsets by a certain number of OFDM symbols in the same subframe as the subframe including the P-SCH, the S-SCH, and the P-BCH transmitted from the BS, and transmit the P-SCH, the S-SCH, and the P-BCH of the RS in the same frequency domain or in a different frequency domain.

Or, the RS may set an offset value in the frequency domain, rather than setting it in the time domain with the subframe including the P-SCH, the S-SCH, and the P-BCH transmitted from the BS. Or, the RS may transmit the P-SCH, the S-SCH, and the P-BCH by using a code maintaining orthogonality with signals included in the P-SCH, the S-SCH, and the P-BCH transmitted from the BS, rather than setting an offset value in the time domain and the frequency domain.

III. Type RFS1-C

Figure 11:
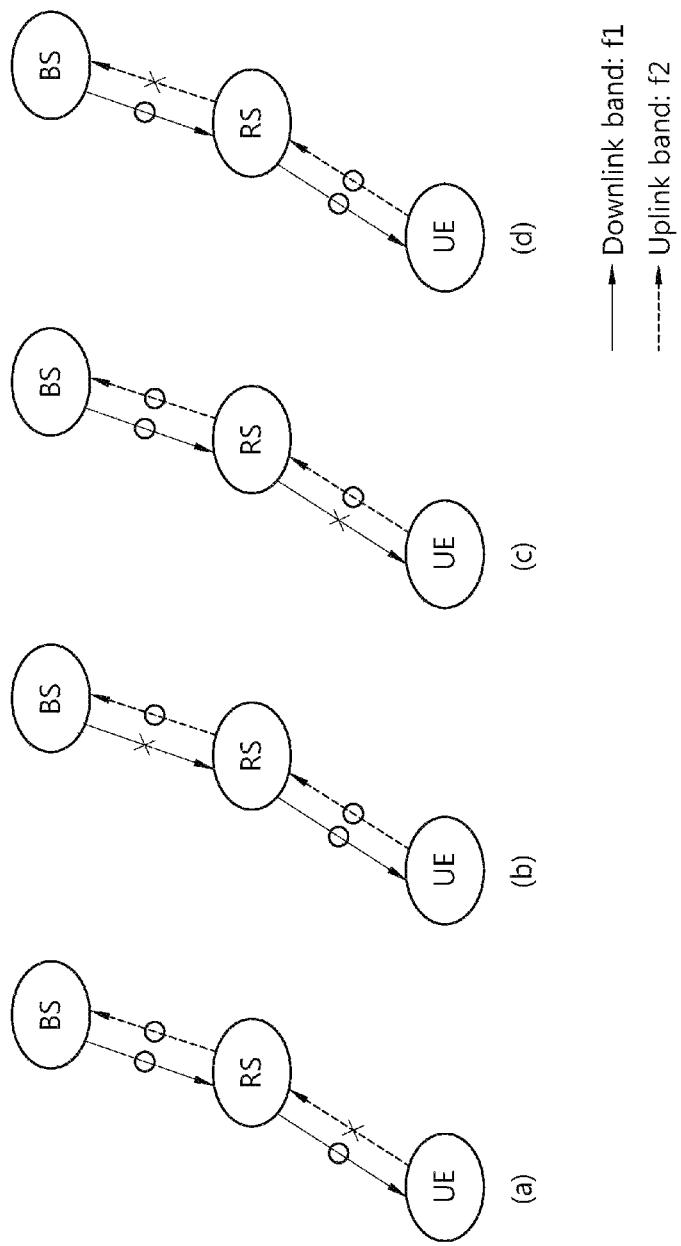
FIG. 11 is a view illustrating an operation of the RS in a type of RFS1-C.

FIG. 11 is a view illustrating an operation of the RS in a type of RFS1-C. With reference to FIG. 11(a), the RS may transmit a signal to the UE through the access downlink while receiving a signal from the BS through the backhaul downlink. Also, the RS may transmit a signal to the BS through the backhaul uplink. In this case, the RS cannot receive a signal from the UE through the access uplink. With reference to FIG. 11(b), the RS may transmit a signal to the BS through the backhaul uplink while receiving a signal from the UE through the access uplink. Also, the RS may transmit a signal to the UE through the access downlink. In this case, the RS cannot receive a signal from the BS through the backhaul downlink. With reference to FIG. 11(c), the RS may transmit a signal to the BS through the backhaul uplink while receiving a signal from the UE through the access uplink. Also, the RS may receive a signal from the BS through the backhaul downlink. In this case, the RS cannot transmit a signal to the UE through the access downlink. With reference to FIG. 11(d), the RS may transmit a signal to the UE through the access downlink while receiving a signal from the BS through the backhaul downlink. Also, the RS may receive a signal from the UE through the access uplink. In this case, the RS cannot transmit a signal to the BS through the backhaul uplink.

III-1. Radio Frame Structure

Figure 12:
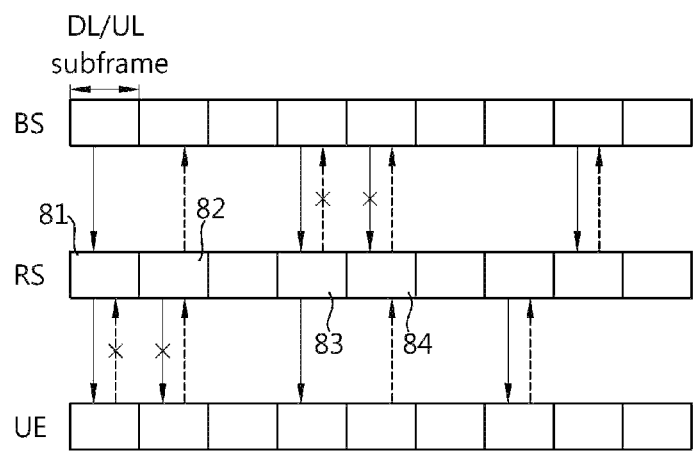
FIG. 12 is a view illustrating a transmitting/receiving operation of signals according to subframes when the RS sets a timing offset value as 0 or as a value within the OFDM symbol CP length in downlink subframes and uplink subframes with respect to the type of RFS1-C.

FIG. 12 is a view illustrating a transmitting/receiving operation of signals according to subframes when the RS sets a timing offset value as 0 or as a value within the OFDM symbol CP length in downlink subframes and uplink subframes.

With reference to FIG. 12, the RS may transmit a signal of downlink frequency band to the UE during a subframe 81 in which the RS receives a signal from the BS in the downlink frequency band, but cannot receive a signal of uplink frequency band from the UE. Also, the RS may receive a signal of uplink frequency band from the UE during a subframe 82 in which the RS transmits a signal of uplink frequency band to the BS but cannot transmit a signal of downlink frequency band to the UE. The RS may receive a signal of downlink frequency band from the BS during a subframe 83 in which the RS transmits a signal of downlink frequency band to the UE, but cannot transmit a signal of uplink frequency band to the BS. The RS may transmit a signal of uplink frequency band to the BS during a subframe 84 in which the RS receives a signal of uplink frequency band from the UE, but cannot receive a signal of downlink frequency band from the BS.

The case in which the timing offset of the downlink subframe and that of the uplink subframe in the backhaul link and the access link are 0 has been described with reference to FIG. 12. In this respect, when the timing offsets are not 0 and there is a difference by a value greater than the OFDM symbol CP length, the subframes during which the RS cannot transmit or receive a signal may be further limited according to the positions of the downlink subframes and the uplink subframes.

Figure 13:
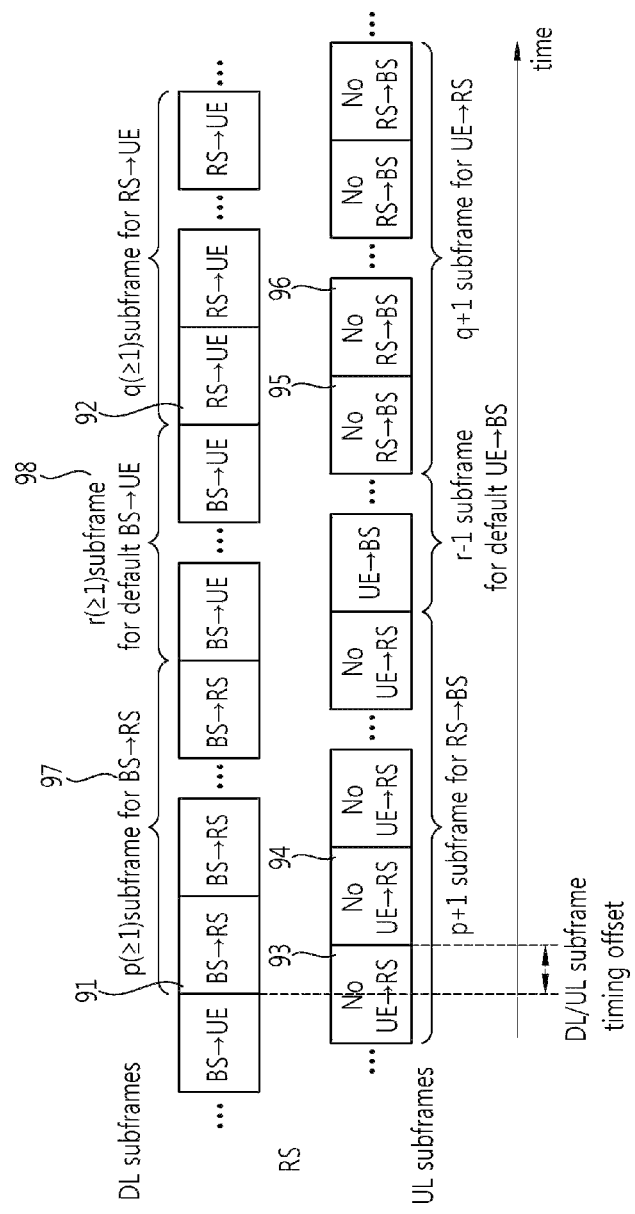
FIG. 13 is a view illustrating a transmitting/receiving operation of signals of the RS in uplink subframes according to downlink subframes when a timing offset value is greater than the OFDM symbol CP length in downlink subframes and uplink subframes with respect to the type of RFS1-C.

FIG. 13 is a view illustrating a transmitting/receiving operation of signals of the RS in uplink subframes according to downlink subframes when a timing offset value is greater than the OFDM symbol CP length in downlink subframes and uplink subframes.

With reference to FIG. 13, a downlink subframe during which the RS receives a signal from the BS and a downlink subframe during which the RS transmits a signal to the UE may temporally overlap with two uplink subframes due to a timing offset value. Namely, a downlink subframe 91 may temporally overlap with two uplink subframes 93 and 94 and another downlink subframe 92 may temporally overlap with another two uplink subframes 95 and 96. In such a case, during the two uplink subframes 93 and 94 overlapping with the downlink subframe 91 during which the RS receives a signal from the BS, preferably, the UE does not transmit a signal to the RS, the UE transmits a signal to the BS or the RS transmits a signal to the BS.

During the two uplink subframes 95 and 96 overlapping with the downlink subframe 92 in which the RS transmits a signal to the UE, preferably, the RS does not transmit a signal to the BS, and the UE transmits a signal to the BS or transmits a signal to the RS.

When a plurality of downlink subframes during which the RS receives a signal from the BS or a plurality of downlink subframes during which the RS transmits a signal to the UE are contiguous, r (r is an integer greater than 1) number of downlink subframes following the last downlink subframe may be assigned only for the BS to transmit a signal to the UE, rather than being assigned for the RS's transmission and reception. Namely, in FIG. 13, when p number of downlink subframes 97 are assigned for the RS to receive a signal from the BS, r number of downlink subframes 98 following the p number of downlink subframes 97 may be assigned for the BS to transmit a signal to the UE. Also, the r number of downlink subframes 98 may be assigned by a certain number of times, e.g., only one, in n number of radio frames. This aims at minimizing the assignment of the downlink subframes not related to a transmission and reception of the RS.

The RS transmits a signal to the BS or the UE transmits a signal to the BS during all the uplink subframes which may partially temporally overlap with downlink subframes during which the RS receives a signal from the BS. Namely, during all the uplink subframes which may partially temporally overlap with downlink subframes during which the RS receives a signal from the BS, the RS does not receive a signal from the UE.

Also, the RS receives a signal from the UE or the BS receives a signal from the UE during all the uplink subframes which may partially temporally overlap with the downlink subframes during which the RS transmits a signal to the UE. Namely, during all the uplink subframes which may partially temporally overlap with the downlink subframes during which the RS transmits a signal to the UE, the RS does not transmit a signal to the BS.

Figure 14:
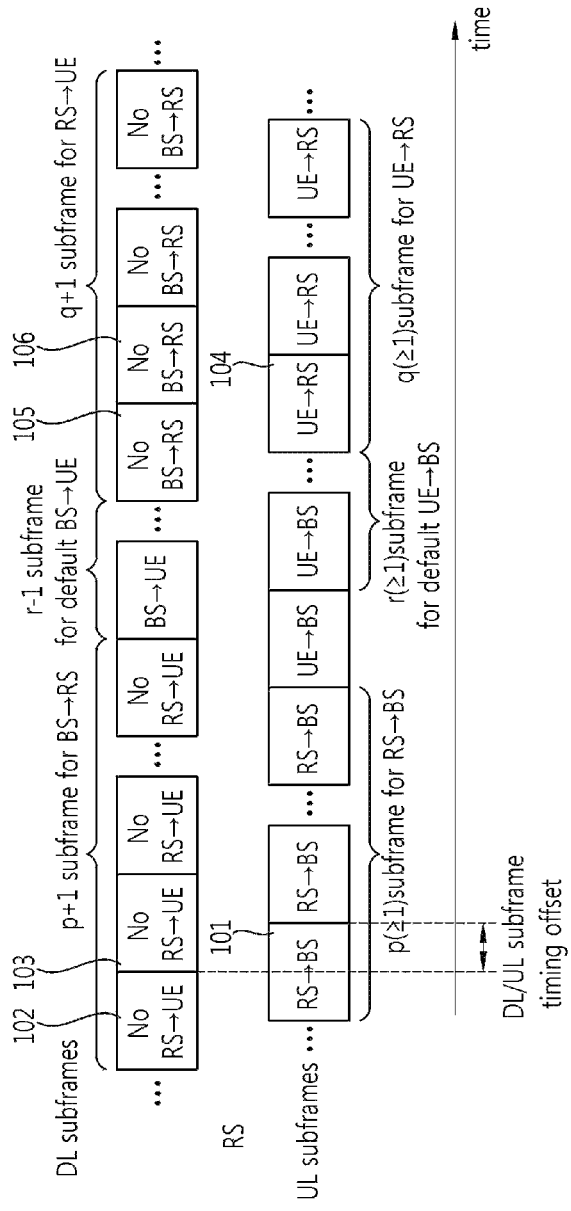
FIG. 14 is a view illustrating a transmitting/receiving operation of signals of the RS in downlink subframes according to uplink subframes when a timing offset value is greater than the OFDM symbol CP length in downlink subframes and uplink subframes with respect to the type of RFS1-C.

FIG. 14 is a view illustrating a transmitting/receiving operation of signals of the RS in downlink subframes according to uplink subframes when a timing offset value is greater than the OFDM symbol CP length in downlink subframes and uplink subframes.

With reference to FIG. 14, during the two downlink subframes 102 and 103 overlapping with an uplink subframe 101 in which the RS transmits a signal to the BS, preferably, the RS does not transmit a signal to the UE, and the RS receives a signal from the BS or the BS transmits a signal to the UE.

During the two downlink subframes 105 and 106 overlapping with an uplink subframe 104 in which the RS receives a signal from the UE, preferably, the RS does not receive a signal from the BS, and the RS transmits a signal to the UE or the BS transmits a signal to the UE.

When a plurality of uplink subframes during which the RS transmits a signal to the BS or a plurality of uplink subframes during which the RS receives a signal from the UE are contiguous, r (r is an integer greater than 1) number of uplink subframes following the last uplink subframe may be assigned only for the UE to transmit a signal to the BS, rather than being assigned for the RS's transmission and reception.

The RS does not transmit a signal to the UE during all the downlink subframes which may partially temporally overlap with uplink subframes during which the RS transmits a signal to the BS. Also, the RS does not receive a signal from the BS during all the downlink subframes which may partially temporally overlap with the uplink subframes during which the RS receives a signal from the UE.

III-2. P/S-SCH and P-BCH Timing of RS

The RS may transmit the P-SCH, the S-SCH, and the P-BCH of the RS during the same subframe as the subframe including the P-SCH, the S-SCH, and the P-BCH transmitted by the BS. The RS may have a cell ID different from that of the BS. The LIE may receive the P-SCH, the S-SCH, and the P-BCH from the BS and the RS during the same OFDM symbol of the same subframe and recognize a downlink synchronization process of the RS through the cell ID of the RS.

The RS is limited to transmit a signal to the BS during the uplink subframe which may partially temporally overlaps with the downlink subframe during which the RS transmits the P-SCH, the S-SCH, and the P-BCH to the UE. This is because the RS cannot simultaneously perform a transmission in different frequency bands.

IV. Type RFS1-D

Figure 15:
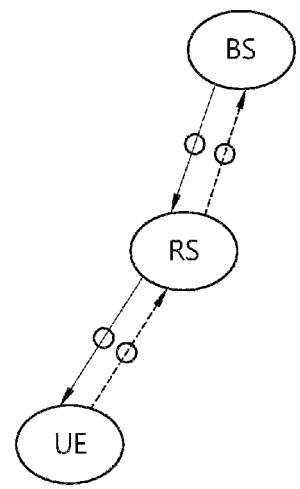
FIG. 15 is a view illustrating an operation of the RS in a type of RFS1-D.

FIG. 15 is a view illustrating an operation of the RS in the type of RFS1-D. With reference to FIG. 15, the RS may simultaneously transmit and receive signals in the same frequency band, and also simultaneously transmit (or receive) signals in different frequency bands.

IV-1. Radio Frame Structure

Figure 16:
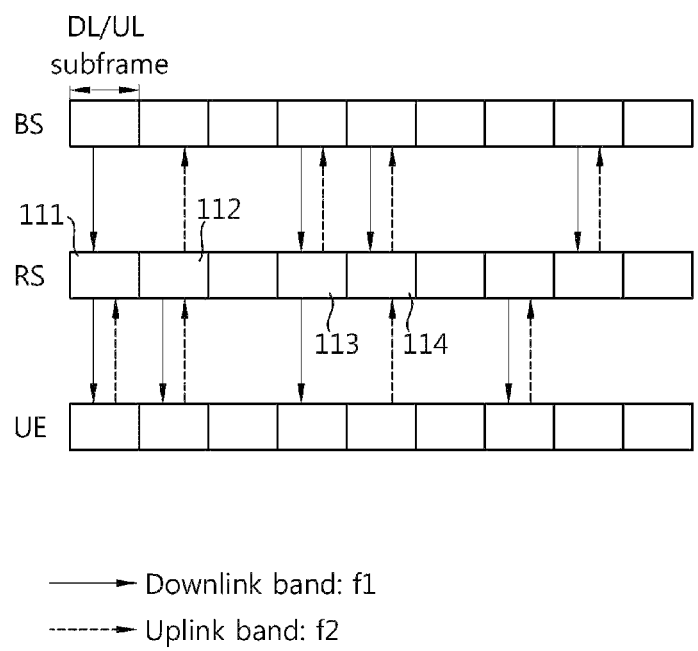
FIG. 16 is a view illustrating a transmitting/receiving operation of signals according to subframes when the RS sets a timing offset value as 0 or as a value within the OFDM symbol CP length in downlink subframes and uplink subframes with respect to the type of RFS1-D.

FIG. 16 is a view illustrating a transmitting/receiving operation of signals according to subframes when the RS sets a timing offset value as 0 or as a value within the OFDM symbol CP length in downlink subframes and uplink subframes.

With reference to FIG. 16, the RS may transmit a signal of downlink frequency band to the UE during a subframe 111 in which the RS receives a signal from the BS in the downlink frequency band, and may also receive a signal of uplink frequency band from the UE. Also, the RS may receive a signal of uplink frequency band from the UE during a subframe 112 in which the RS transmits a signal of uplink frequency band to the BS, and may also transmit a signal of downlink frequency band to the UE. The RS may receive a signal of downlink frequency band from the BS during a subframe 113 in which the RS transmits a signal of downlink frequency band to the UE, and may also transmit a signal of uplink frequency band to the BS. The RS may transmit a signal of uplink frequency band to the BS during a subframe 114 in which the RS receives a signal of uplink frequency band from the UE, and may also receive a signal of downlink frequency band from the BS.

IV-2. P/S-SCH and P-BCH Timing of RS

The RS may transmit the P-SCH, the S-SCH, and the P-BCH of the RS during the same subframe as the subframe including the P-SCH, the S-SCH, and the P-BCH transmitted by the BS. Or, in order to perform effective downlink synchronization, the RS may transmit its P-SCH, S-SCH, and P-BCH in the same frequency domain or in a different frequency domain by setting a certain number of subframe offsets with the subframe including the P-SCH, S-SCH, and P-SCH transmitted from the BS.

Or, the RS may set offsets by a certain number of OFDM symbols in the same subframe as the subframe including the P-SCH, the S-SCH, and the P-BCH transmitted from the BS, and transmit the P-SCH, the S-SCH, and the P-BCH of the RS in the same frequency domain or in a different frequency domain.

Or, the RS may set an offset value in the frequency domain, rather than setting it in the time domain with the subframe including the P-SCH, the S-SCH, and the P-BCH transmitted from the BS. Or, the RS may transmit the P-SCH, the S-SCH, and the P-BCH by using a code maintaining orthogonality with signals included in the P-SCH, the S-SCH, and the P-BCH transmitted from the BS, rather than setting an offset value in the time domain and the frequency domain.

<PRACH Transmission Scheme in Wireless Communication System Including RS>

A method for performing a random access process by a UE in a wireless communication system including an RS to which any one of the foregoing types RFS1-A to RFS1-D is applied will now be described. First, the UE may perform a random access process toward the BS in the following cases.

(1) When the UE performs an initial access because it does not have an RRC connection with the BS (2) When the UE first access a target cell in a handover procedure (3) When requested according to a command from the BS (4) When uplink data is generated in a state in which time alignment of uplink is not matched or uplink radio resources are not assigned (5) When a recovery process is performed in the occurrence of a radio link failure or a handover failure The random access process in the wireless communication system including the RS may be performed as follows.

Figure 17:
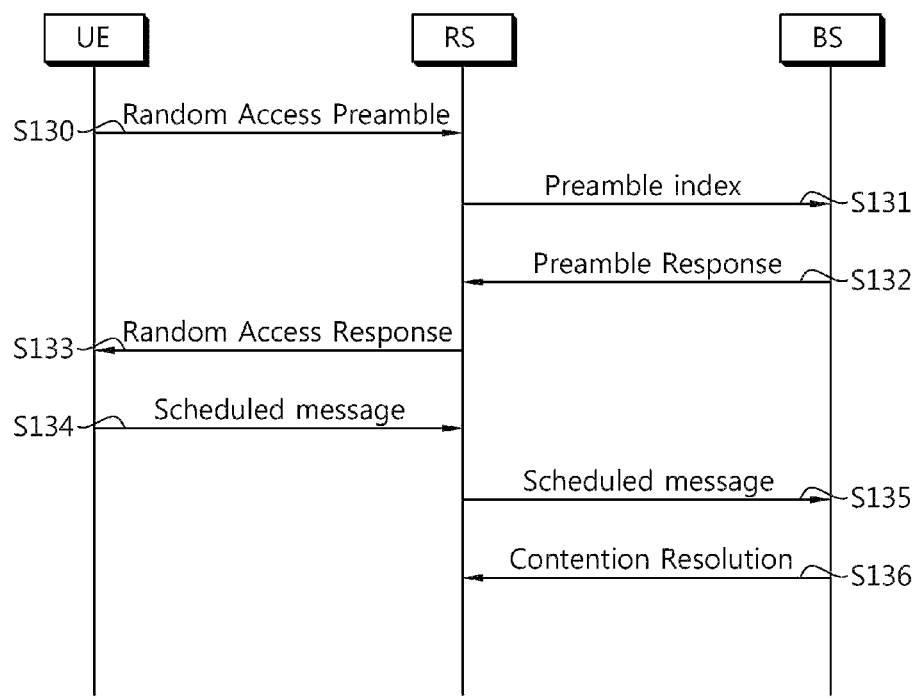
FIG. 17 is a flow chart illustrating a random access process according to an exemplary embodiment of the present invention.

FIG. 17 is a flow chart illustrating a random access process according to an exemplary embodiment of the present invention.

With reference to FIG. 17, in step S130, the UE selects one random access preamble from a set of random access preambles, and transmits the selected random access preamble to the RS through PRACH resource. Information regarding the configuration of the set of the random access preambles may be obtained from the BS through a portion of system information or a handover command message.

In step S131, the RS detects a random access preamble and transmits an index of the detected random access preamble to the BS. In step S132, the BS transmits a response with respect to the random access preamble to the BS. The response with respect to the preamble may include uplink radio resource allocation information, an RAPID (Random Access Preamble Identifier), temporary C-RNTI (Cell-Radio Network Temporary Identity), and the like.

In step S133, the RS transmits the received preamble response, as a random access response, to the UE. The random access response may include a time alignment (TA) value for uplink synchronization of the UE, uplink radio resource allocation information, an RAPID for identifying UEs performing random access, and a temporary identifier of the UE such as the temporary C-RNTI. The RAPID is to identify a received random access preamble.

In step S134, the UE attempts receiving of its random access response within a random access response reception window. The random access response reception window, which refers to a window for monitoring a random access response, may be indicated through a portion of the system information or a handover command message. In detail, the random access response is transmitted in the form of a MAC PDU, and the MAC PDU is delivered via the PDSCH, a physical channel. Reception information of the PDSCH is obtained via the PDCCH, a control channel. The PDCCH carries information regarding a UE for receiving the PDSCH, radio resource allocation information of the PDSCH, a transmission format of the PDSCH, and the like. The UE first monitors the PDCCH within subframes belonging to the random access response reception window, and when receiving of the PDCCH is successful, the UE then receives the random access response via the PDSCH indicated by the PDCCH. The UE applies the time alignment value and transmits a scheduled message including the random access identifier to the RS by using the uplink radio resource allocation information.

In step S135, the RS receives the scheduled message from the UE and transmits the received message as it is to the BS. In step S136, the BS receives the scheduled message and then transmits a contention resolution message including the random access identifier to the RS. The RS transmits the contention resolution message to the UE.

Figure 18:
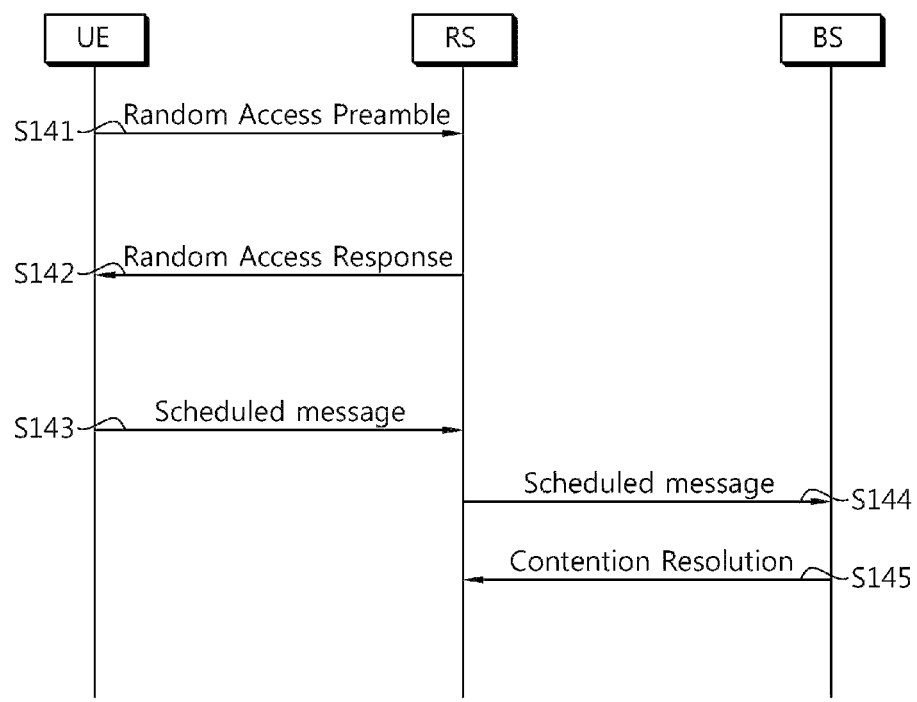
FIG. 18 is a flow chart illustrating a random access process according to another exemplary embodiment of the present invention.

FIG. 18 is a flow chart illustrating a random access process according to another exemplary embodiment of the present invention.

With reference to FIG. 18, in step S141, the UE selects the UE selects one random access preamble from a set of random access preambles, and transmits the selected random access preamble to the RS through PRACH resource. In step S142, the RS transmits a random access response to the UE. Namely, the RS generates the random access response and directly transmits it to the UE, rather than transmitting an index of the random access preamble to the BS. The random access response may include a time alignment (TA) value for uplink synchronization of the UE, uplink radio resource allocation information, an RAPID for identifying UEs performing random access, and a temporary identifier of the UE such as the temporary C-RNTI. The RAPID is to identify a received random access preamble.

In step S143, the UE monitors a PDCCH in subframes belonging to a random access response reception window. When receiving of the PDCCH is successful, the UE receives the random access response via the PDSCH indicated by the PDCCH. The UE applies the time alignment value and transmits a scheduled message including the random access identifier to the RS by using the uplink radio resource allocation information.

In step S144, the RS transmits the scheduled message received from the UE to the BS. Then, in step S145, the BS transmits a contention resolution message including the random access identifier to the RS. The RS transmits the contention resolution message to the UE.

In another random access procedure according to an exemplary embodiment of the present invention, when the RS receives the random access preamble from the UE, the RS generates a new random access preamble on the basis of an index of the received random access preamble. The RS transmits the newly generated random access preamble at a PRACH transmission point in time controlled by the BS to the BS, and the BS detects the new access preamble. When the BS transmits a random access response with respect to the new access preamble which has been transmitted by the RS, to the RS, the RS may relay the random access response as it is to the UE. This method is advantageous in that an additional signaling method and channel designing are not required for delivering the indexes of the random access preambles detected by the RS to the BS.

<Method for Adjusting Timing Offset Between Uplink Subframe and Downlink Subframe in RS>

A method for setting a timing offset between an uplink subframe and a downlink subframe in the RS in the wireless communication system including the RS to which any one of the foregoing types RFS1-A to RFS1-D is applied will now be described.

When the RS transmits or receives a signal to or from the UE or the BS, the uplink subframe and the downlink subframe may have a difference temporally, rather than being consistent with each other temporally. Such a temporal difference is called a timing offset. Preferably, the RS adjusts the timing offset value of the uplink subframe and the downlink subframe such that it comes within a cyclic prefix length on OFDM symbols. Ideally, the timing offset value is adjusted to be 0. When the RS does not define a physical channel in order to adjust the timing offset of the uplink and the downlink in the backhaul link, the RS may periodically receive the P-SCH, the S-SCH, and the P-BCH transmitted by the BS, to thus adjust the timing offset value to be 0 or to be within the cyclic prefix length on the OFDM symbols.

The BS may include synchronization information for the RS in the P-BCH and transmit the same. Or, the BS may include the synchronization information for the RS in system information and transmit the same. In a situation in which an RRC L1 parameter configuration is limited, a system information class including RS-related information may be designated as system information and transmitted such that only the RS or both the RS and the UE may receive it via a BCCH.

When a physical channel is defined for synchronization of a transmission timing of the uplink and downlink in the backhaul link, a downlink common reference signal (RS) may be used or a pilot signal (or beacon signal) may be inserted into a certain time interval of a certain radio frame, so that the RS may perform synchronization by using such signals.

<Method for Delivering Resource Allocation Information Between BS and RS>

A method for delivering resource allocation information between the BS and the RS in the wireless communication system including the RS to which any one of the foregoing types RFS1-A to RFS1-D is applied will now be described.

When the RS assigns radio resources to the access uplink and the access downlink with the UE, it needs to know about the resource allocation of the backhaul link. The reason is because, as mentioned above with respect to the foregoing RFS1-A to RFS1-D, the RS is related to both the backhaul link and the access link and there may be a limitation in resource allocation.

For resource allocation of the backhaul link, two types of information, namely, subframe assignment used for the backhaul link and radio resource allocation within assigned subframes, are required. The radio resource allocation may be used for the backhaul downlink or for the backhaul uplink.

The subframes used for the backhaul link may be dedicated subframes. Namely, the subframes may be used only for the backhaul link between the BS and the RS, not for communication with a macro UE or a Relay UE. In the subframes used for the backhaul link, a legacy UE supporting only LTE may stop a channel estimation. In a different way, in the defined backhaul subframes, a resource allocation with respect to a backhaul link transmission and a transmission between the existing macro UE and the BS may be multiplexed in the form of an FDM. The subframe assignment used for the backhaul link may be defined in various manners.

In an exemplary embodiment, the subframes used for the backhaul link may be previously defined between the BS and the RS. This is advantageous in that an additional signaling is not required. Such a scheme is called a persistent type. In a different exemplary embodiment, the BS may periodically or non-periodically inform the RS of the subframes used for the backhaul link. For a certain number of contiguous radio frames, the BS may inform the RS of the subframes at fixed positions in each radio frame. For example, the BS may inform the RS that the third subframes of four radio frames, starting from a current radio frame, are used for the backhaul link. This is called a semi-persistent type. The information regarding the assigned subframes may be provided through a portion of the system information, an RRC (Radio Resource Control) message and/or RS-specific signaling. The subframes used for the backhaul link may be assigned by the BS according to a request from the RS.

Radio resource allocation within a subframe may be defined in various manners. In an exemplary embodiment, radio resource used in the subframes assigned for the backhaul link may be previously defined between the BS and the RS. For example, a subframe may be divided into three radio resource areas, and three RSs may use each of the assigned radio resource areas.

Or, radio resource allocation may be dynamically determined for each of the subframes assigned for the backhaul link.

In a different exemplary embodiment, the BS may inform the RS about the radio resources used in the subframes assigned for the backhaul link through a broadcast channel such as a portion of system information. In a different exemplary embodiment, the BS may inform the RS about the radio resources used in the subframes assigned for the backhaul link through an higher layer message such as an RRC message or a MAC message. In a different exemplary embodiment, the BS may inform the RS about the radio resources used in the subframes assigned for the backhaul link through a PDCCH. In this case, an identifier for the RS may be masked in the CRC of the PDCCH.

In order for the BS to provide information regarding the subframes assigned for the backhaul link and/or information regarding the radio resource allocation in the subframes to the RS, a new DCI format may be defined. For example, the BS may reduce a MCS (Modulation and Coding Scheme) and the number of bits of an RA (resource allocation) field and/or an RV (redundancy version) field included in the new DCI format compared with the existing DCI format and assign the same. Alternatively, an available rank value may be limited between the BS and the RS. For example, when an available maximum rank is 4, the rank between the RS and the BS may be limited to 3 or 4. Accordingly, in case of MIMO transmission, the rank with respect to a transmission and the field of a TPMI (Transmit Precoding Matrix Index) value designating a precoding matrix may be reduced, compared with an existing case, and assigned.

The CCE set which may be used for the PDCCH between the BS and the RS may be limited. For example, when the entire available CCE set is {1, 2, 4, 8}, only {4, 8} or {8} may be used for the DCI format for a resource allocation to the RS (namely, one of PDCCH formats 1, 2, and 3 may be selected). The corresponding designation may be informed to the RS through a relay node-specific RRC message, a MAC message, or a PDCCH. Alternatively, the PDCCH between the BS and the RS may be monitored within a common search space. Alternatively, the PDCCH between the BS and the RS may be monitored within a specific search space. In order to define the specific search space, the PDCCH between the BS and the RS may have a specific search start point. The search start point may be obtained on the basis of a unique identifier of the RS. The number of times of blind decoding according to monitoring of the PDCCH may be reduced by limiting the available CCE set or setting a search space.

The BS may add a sequence for preventing an error in the DCI format including the radio resource allocation of the RS. By providing robustness with respect to an error generation between the BS and the RS, the problems that the RS erroneously recognizes a PDCCH transmitted to a different RS as a PDCCH transmitted to the RS itself or an error-generated PDCCH is recognized as an error-free PDCCH may be reduced.

Figure 19:
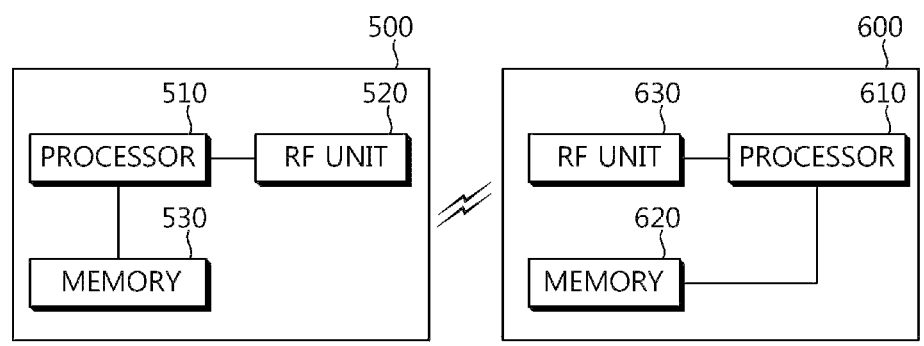
FIG. 19 is a schematic block diagram of a wireless communication system according to an exemplary embodiment of the present invention.

FIG. 19 is a schematic block diagram of a wireless communication system according to an exemplary embodiment of the present invention. A BS 500 includes a processor 510, a memory 530, and an RF unit 520. The processor 510 may assign subframes during which the RS receives or transmits a signal to subframes previously agreed between the RS and the BS, and dynamically assign a frequency band in which a signal is received or transmitted during the assigned subframe. In this case, the processor 510 may transmit assignment information regarding the foregoing previously agreed subframe as a higher layer signal and the assignment information regarding the dynamically assigned frequency band through the PDCCH. Radio interface protocol layers may be implemented by the processor 510. The memory 530 connected to the processor 510 stores various types of information for driving the processor 510. The RF unit 520 connected to the processor 510 transmits and/or receives a radio signal.

An RS 600 includes a processor 610, a memory 620, and an RF unit 630. The processor 610 obtains information regarding assigned subframes among a plurality of subframes, and monitors a PDCCH carrying information regarding a radio resource allocation within the assigned subframes. The processor 610 receives data from the BS on the basis of the radio resource allocation of the monitored PDCCH. The memory 620 connected to the processor 610 stores various types of information for driving the processor 610. The RF unit 630 connected to the processor 610 transmits and/or receives a radio signal.

The processors 510 and 610 may include an ASIC (Application-Specific Integrated Circuit), a different chip set, a logical circuit and/or a data processing device. The memories 530 and 620 may include a ROM (Read-Only Memory), a RAM (Random Access Memory), a flash memory, a memory card, a storage medium and/or any other storage devices. The RF units 520 and 630 may include a baseband circuit for processing a radio signal. When an exemplary embodiment is implemented by software, the foregoing scheme may be implemented as a module (process, function, and the like) performing the foregoing functions. The module may be stored in the memories 530 and 620, and executed by the processors 510 and 610. The memories 530 and 620 may be provided within or outside the processors 510 and 610 and may be connected to the processors 510 and 610 through various well-known means.

In the foregoing exemplary system, the methods are described on the basis of sequential steps or blocks, but the present invention is not limited to the order of the steps, and a certain step may be performed in different order from the other steps or may be simultaneously performed. Also, a skilled person in the art would understand that the steps denoted in the flow chart are not exclusive, a different step may be included, and one or more steps of the flow chart may be deleted without affecting the scope of the present invention.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for operating a relay station (RS) in a wireless communication system, the method comprising:

obtaining subframe information and control channel element (CCE) information from a base station (BS),
wherein the subframe information indicates assigned subframes which are located at fixed positions within a certain number of contiguous radio frames, and the CCE information indicates a number, N, corresponding to a number of CCEs, to be monitored in the assigned subframes for a relay-physical downlink control channel (R-PDCCH), and
wherein the R-PDCCH carries radio resource allocation information regarding a radio resource allocation within the assigned subframes;
monitoring the N CCEs in each of the assigned subframes for the R-PDCCH, the N CCEs being a monitoring unit of the R-PDCCH; and
receiving data from the base station on the basis of the radio resource allocation information of the R-PDCCH,
wherein when the number of CCEs to be monitored in a physical downlink control channel (PDCCH) for a user equipment (UE) comprises 1, 2, 4 and 8 CCEs, the number, N, indicated by the CCE information is restricted to either 4 or 8,
wherein the radio resource allocation information is received through a RS downlink control information (DCI) format, and
wherein a number of bits of a field included in the RS DCI format is smaller than a number of bits of a corresponding field included in a UE DCI format which is used for radio resource allocation for the UE.

2. The method of claim 1, wherein when the data is received from the base station through a frequency band in the assigned subframes, the relay station does not transmit data to a user equipment (UE) through the frequency band in the assigned subframes.

3. The method of claim 1, wherein the radio resource allocation information is information regarding a frequency band at a fixed position within the assigned subframes.

4. The method of claim 1, wherein the radio resource allocation information is information regarding a frequency band determined for each of the assigned subframes.

5. The method of claim 1, wherein the subframe information and the CCE information is obtained through a portion of system information or an RRC (Radio Resource Control) message received from the base station.

6. The method of claim 1, wherein a Cyclic Redundancy Check (CRC) of the monitored R-PDCCH is masked by an unique identifier of the relay station.

7. The method of claim 1, wherein, in monitoring the R-PDCCH, the R-PDCCH is monitored from a fixed CCE.

8. The method of claim 7, wherein the fixed CCE is defined on the basis of the unique identifier of the relay station.

9. A relay station (RS) comprising:
an RF unit configured to transmit and receive a radio signal; and
a processor connected to the RF unit, wherein the processor is configured to:

obtain subframe information and control channel element (CCE) information from a base station (BS), wherein the subframe information indicates assigned subframes which are located at fixed positions within a certain number of contiguous radio frames, and the CCE information indicates a number, N, corresponding to a number of CCEs, to be monitored in the assigned subframes for a relay-physical downlink control channel (R-PDCCH), wherein the R-PDCCH carries radio resource allocation information regarding a radio resource allocation within the assigned subframes, monitor the N CCEs in each of the assigned subframes for the R-PDCCH, the N CCEs being a monitoring unit of the R-PDCCH; and receive data from the base station on the basis of the radio resource allocation information of the R-PDCCH, wherein when the number of CCEs to be monitored in a physical downlink control channel (PDCCH) for a user equipment (UE) comprises 1, 2, 4 and 8 CCEs, the number, N, indicated by the CCE information is restricted to either 4 or 8, wherein the radio resource allocation information is received through a RS downlink control information (DCI) format, and wherein a number of bits of a field included in the RS DCI format is smaller than a number of bits of a corresponding field included in a UE DCI format which is used for radio resource allocation for the UE.

* * * * *